(12) United States Patent
Tsuji et al.

(10) Patent No.: US 6,575,635 B1
(45) Date of Patent: Jun. 10, 2003

(54) MULTI-LAYER SLIDING BEARING

(75) Inventors: Hideo Tsuji, Nagoya (JP); Hideo Ishikawa, Nagoya (JP); Takayuki Shibayama, Nagoya (JP)

(73) Assignee: Daido Metal Company, Ltd., Nagoya (JP)

( * ) Notice: Subject to any disclaimer, the term of this patent is extended or adjusted under 35 U.S.C. 154(b) by 93 days.

(21) Appl. No.: 09/688,689

(22) Filed: Oct. 17, 2000

(30) Foreign Application Priority Data

Nov. 4, 1999 (JP) .......................................... 11-313740

(51) Int. Cl.$^7$ .............................................. F16C 33/12
(52) U.S. Cl. ........................ 384/276; 384/907; 384/912
(58) Field of Search .............................. 384/276, 294, 384/907, 912, 913; 428/643, 645, 650

(56) References Cited

U.S. PATENT DOCUMENTS

| | | | | |
|---|---|---|---|---|
| 3,077,285 A | * | 2/1963 | Budininkas | 384/276 |
| 3,623,205 A | * | 11/1971 | Scott | 384/276 |
| 4,978,587 A | * | 12/1990 | Mori et al. | 428/645 |
| 5,056,936 A | * | 10/1991 | Mahrus et al. | 384/276 |
| 5,116,692 A | * | 5/1992 | Mori et al. | 428/650 |
| 5,209,578 A | * | 5/1993 | Eastham et al. | 384/912 |
| 5,300,368 A | * | 4/1994 | Kubert et al. | 384/912 |
| 5,911,513 A | * | 6/1999 | Tsuji et al. | 384/276 |

FOREIGN PATENT DOCUMENTS

| | | |
|---|---|---|
| GB | 2 182 729 A | 5/1987 |
| GB | 2 233 718 A | 1/1991 |
| JP | 55-110750 | * 8/1980 |
| JP | 1-307512 | 12/1989 |
| JP | 11132235 | 5/1999 |

* cited by examiner

*Primary Examiner*—William C. Joyce
(74) *Attorney, Agent, or Firm*—Browdy and Neimark

(57) ABSTRACT

In order to enhance the anti-seizure property of the sliding bearing while making the content of Pb contained in the Sn-based overlay layer smaller or while using no Pb if possible, there is provided a multi-layer sliding bearing comprising a back metal layer, a bearing alloy layer, an intermediate plating layer and a Sn-based overlay layer, the Sn-based overlay layer containing reinforcing metal and/or inorganic particles, the content of the reinforcing metal and/or inorganic particles being varied step-wise or successively in a direction of a thickness of the overlay layer so that the content in a thickness-wise central portion of said overlay layer is relatively high and so that another content in a surface portion of the overlay layer is zero or smaller than the content in the central portion.

19 Claims, 2 Drawing Sheets

MULTI-LAYER SLIDING BEARING

BACKGROUND OF THE INVENTION

The invention relates to a multi-layer sliding bearing comprising a back metal layer, a bearing alloy layer, an intermediate plating layer and a Sn-based overlay layer.

Hitherto, there are known alloy bearings each provided with an overlay layer for enhancing initial conformability and foreign matter embeddability, and regarding the overlay layer, for example, Sn-based or Pb-based overlay layer for an aluminum alloy sliding bearing are known. In general, when forming the overlay layer on the Al bearing alloy layer, wet type plating is usually adopted. However, in a case where a plating layer of Sn based or Pb based alloy is formed directly on the Al bearing alloy layer, the resultant bonding strength between them becomes inferior. To prevent this unfavorable inferior bonding strength from occurring, there is provided an intermediate plating layer of a hard metal such as Ni or Fe or Co, on which intermediate plating layer an overlay layer having a high bonding strength strength is formed by the plating of the Sn-based or Pb-based alloy.

In the conventional Al alloy sliding bearing provided with the intermediate plating layer, the hard intermediate plating layer is exposed when the overlay layer is worn out during the use of the sliding bearing, so that the seizure and/or scuffing of the bearing becomes apt to occur. To cope with the problem, it is attempted to obtain a sliding bearing without any intermediate plating layer. For example, in JP-A-1-307512 there is disclosed a sliding bearing in which an Al bearing alloy layer is covered with a Sn-based overlay layer. In this prior art, there is formed, between the Al bearing alloy layer and the overlay layer, a thin intermediate layer not more than 0.5 µm in thickness in which any one of Ni, Co and Fe exists in a mixture state with the components of the Sn-based overlay layer, whereby the bonding strength becomes large between the Al bearing alloy layer and the overlay layer while preventing the seizure and/or scuffing from occurring when the overlay layer is worn out.

The anti-seizure property of the Sn-based overlay layer is inferior to that of the Pb-based overlay layer. Thus, in the sliding bearing disclosed in JP-A-11-132235, the overlay layer is made of a Pb—Sn alloy so that the anti-seizure property thereof may be improved. In this prior art, the overlay layer of the Pb—Sn alloy is formed by a method comprising the steps of: performing in this order a zincate treatment on an Al bearing alloy layer, a thin film-plating treatment for forming Ni or Co or Fe layer of 0.05 to 0.5 µm in thickness, a Sn-plating treatment for forming a Sn layer of 1 to 3 µm in thickness, and a Pb-plating treatment for forming a Pb or Pb alloy layer; and then performing a diffusion treatment by heating the layers in order for Sn in the Sn layer to be diffused so that both of an overlay layer of Pb—Sn alloy and a bonding strength layer in which both of Sn and any one of Ni, Co and Fe exist in the mixture state may be formed.

As explained above, in the sliding bearing of JP-A-11-132235, the overlay layer of Pb based alloy is used for improving the anti-seizure property. However, since Pb causes bad influence in the environment, it is preferred to reduce Pb as little as possible and, if possible, to avoid the use of Pb. Further, in the overlay layer of the Pb-based alloy there is another problem that the overlay layer of the Pb-based alloy reacts with Sn in the Sn plating layer to thereby form a eutectic structure of a low melting point, which eutectic structure causes layer-like wear leading to the exfoliation of the overlay layer.

SUMMARY OF THE INVENTION

The invention is achieved in view of the above-explained situation, and the object of the invention is to obtain a multi-layer sliding bearing causing no substantial problem regarding anti-seizure property while reducing the amount of Pb additive or, if possible, while using no Pb, and at the same time having superior wear resistance.

In order to achieve the objects mentioned above, according to a first aspect of the invention, there is provided a multi-layer sliding bearing comprising a back metal layer, a bearing alloy layer, an intermediate plating layer and a Sn-based overlay layer, the Sn-based overlay layer containing reinforcing metal and/or inorganic particles, the content of the reinforcing metal and/or inorganic particles being varied step-wise or successively in the direction of thickness of the overlay layer so that the content of the reinforcing metal and/or inorganic particles contained in a thickness-wise center part of the overlay layer being relatively large and so that the content of the reinforcing metal and/or inorganic particles contained in the surface part (, that is, in the outermost part) of the overlay layer being zero or smaller than the content in the center part.

In the boundary portion between the Sn-based overlay layer and the intermediate plating layer, since both of Sn and metals constituting the intermediate plating layer exist in a mixed state, the bonding strength of the Sn-based overlay layer is enhanced. Further, since in the overlay layer no Pb is contained, there is no problem of the occurrence of the layer-like wear between the Sn-based overlay layer and the intermediate plating layer.

Further, on the surface of the Sn-based overlay layer there is contained no reinforcing metal or inorganic particles, or the amount thereof is very small if it is contained. Thus, because of the relatively soft Sn, it becomes possible to obtain good initial conformability and foreign matter embeddability. In addition, since in the center of the Sn-based overlay layer the reinforcing metal and/or inorganic particles are contained therein, an alloy of Sn and the reinforcing metal is formed, or the inorganic particles are distributed in the Sn or Sn alloy. According to the constitution, the mechanical strength of the Sn-based overlay layer is enhanced, the wear resistance thereof becoming high, and the anti-seizure property thereof is improved. Of course, since no Pb is contained in the Sn-based overlay layer, the sliding bearing of the invention is superior in view of environmental protection. Incidentally, the term "center" of the Sn-based overlay layer means not only the literal "dimensional center" thereof but also a center portion of a somewhat broad range.

In this case, according to a second aspect of the invention, the bearing alloy layer may be made of a Cu alloy containing no Pb or an Al alloy containing no Pb, in view of environmental protection.

Further, according to a third aspect of the invention, the reinforcing metal contained in the Sn-based overlay layer may be at least one kind selected from the group consisting of Cu, Sb, Ag, In, Zn, Ni, Co, and Fe, and the Sn-based overlay layer is made of a Sn-based alloy containing one or more kinds of reinforcing metal of 0 to 30 mass % and/or inorganic particles of 0 to 25 volume %.

The at least one kind selected from the group consisting of Cu, Sb, Ag, In, Zn, Ni, Co, and Fe forms an alloy with Sn of the Sn-based overlay layer to thereby enhance the mechanical strength and wear resistance of the overlay layer. Further, the inorganic particles is distributed in Sn or Sn alloy of the Sn-based overlay layer to thereby enhance the mechanical strength and wear resistance of the Sn-based overlay layer. In a case where the amount of the reinforcing metal exceeds 30 mass % or the amount of the inorganic substance exceeds 25 volume %, the Sn-based overlay layer becomes excessively hard in hardness with the result that the resistance to fatigue is deteriorated and/or that the attacking property thereof to a counterpart becomes large unfavorably.

According to a fourth aspect of the invention, the intermediate plating layer having a thickness of 0.01 to 8 μm may be made of one metal selected from the group consisting of Ni, Co, Fe, Cu, and Ag or is made of an alloy containing no Pb and containing as the main constituent thereof this metal.

The intermediate plating layer acts to improve the bonding strength of the Sn-based overlay layer and to prevent the components of the Sn-based overlay layer from being diffused into the bearing alloy layer. The metal selected from the group consisting of Ni, Co, Fe, Cu, and Ag has a remarkable bonding strength property and superior effect of preventing the diffusion. However, in a case where the thickness of the intermediate plating layer is less than 0.01 μm, the advantageous effect thereof is lowered, and in another case where this thickness exceeds 8 μm, the cost of the material becomes large in comparison with the degree of the improvement.

According to a fifth aspect of the invention, a back plating layer may be provided on the back of the back metal layer.

For example, in an engine for an automobile, the lowering of rigidity regarding a bearing housing is caused due to a small-shape and light-weight design thereof, so that a fretting phenomenon (, that is, a wear phenomenon occurring between two contact faces subjected to relative movement of micro-amplitude) on the back of a sliding bearing becomes a serious problem. This problem of the fretting phenomenon can be removed by providing the plating layer on the back of the back metal layer.

According to a sixth aspect of the invention, the plating layer may be provided on the back of the back metal layer, and it is preferred that this plating layer has the same composition as that of the Sn-based overlay layer or that of the intermediate plating layer. In this constitution, it is possible to simultaneously perform both of the steps of providing the back plating layer and of providing the Sn-based overlay layer or the intermediate plating layer.

DESCRIPTION OF THE PREFERRED EMBODIMENTS OF THE INVENTION

A description will be given below regarding embodiments in accordance with the invention.

Figure 1:
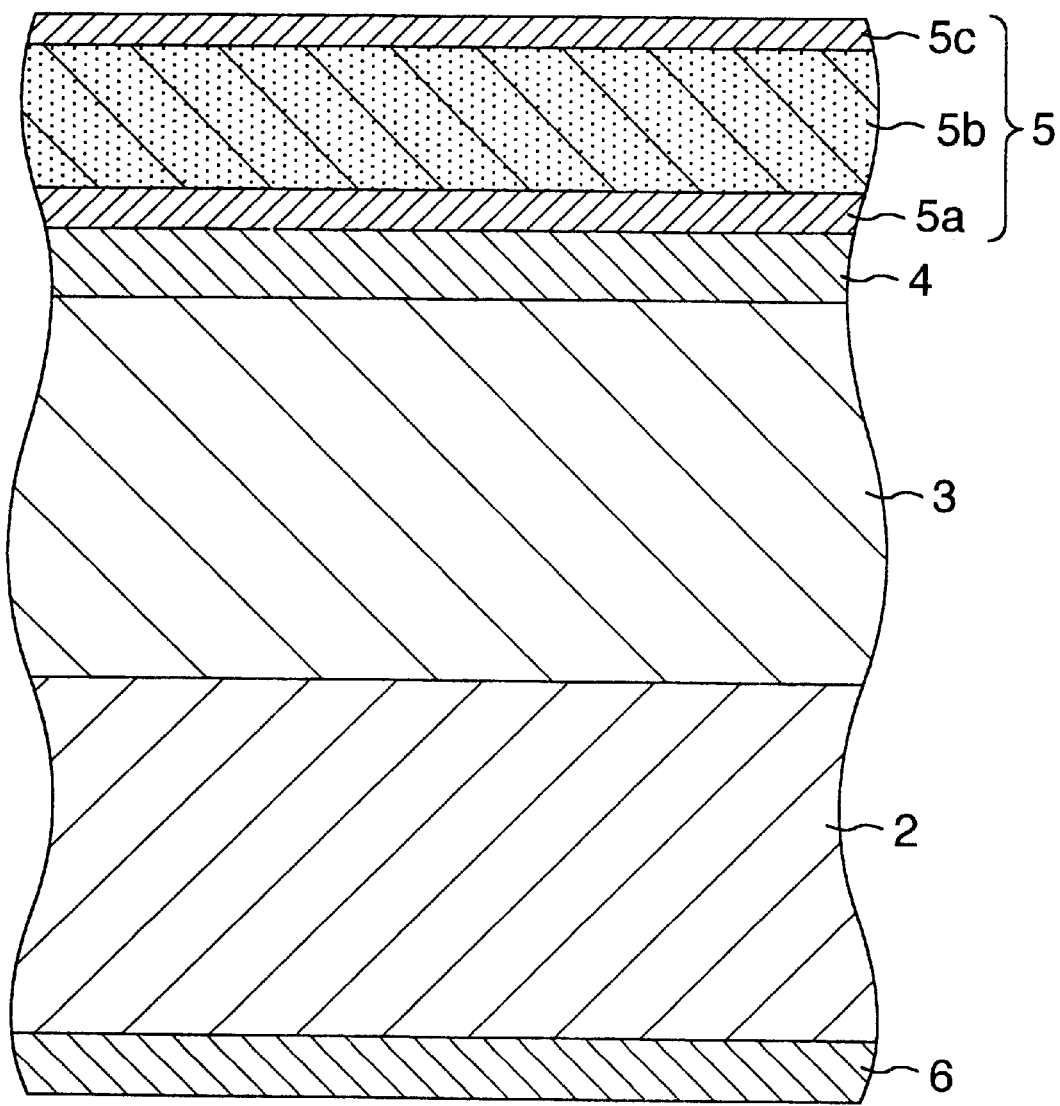
FIG. 1 is a sectional view of a part of a sliding bearing embodying the invention.
Figure 2:
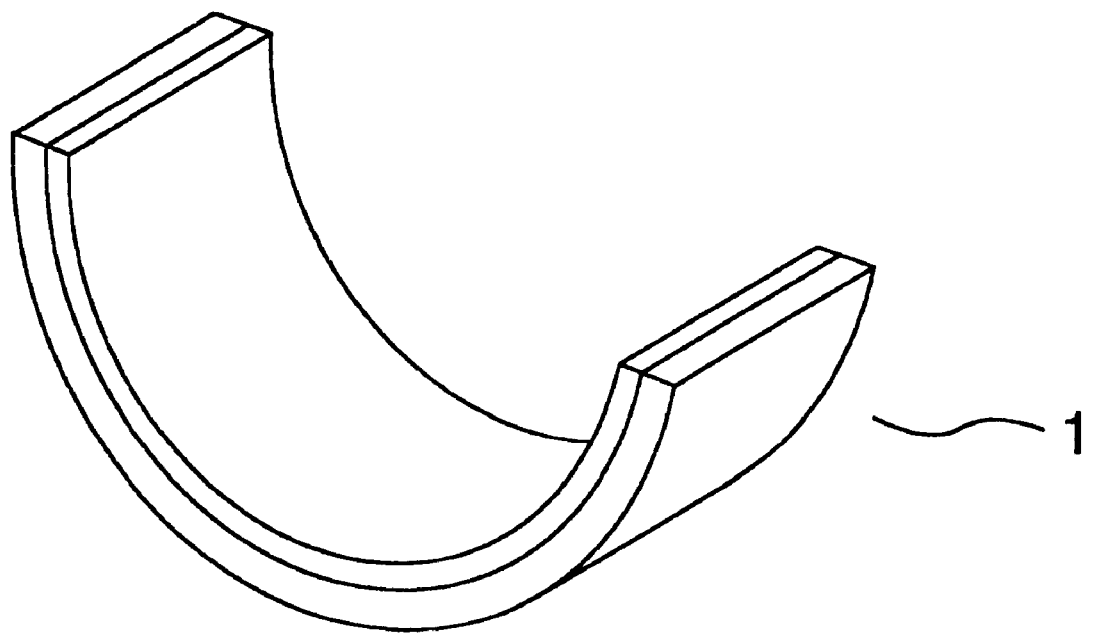
FIG. 2 is a perspective view of a half bearing.

A bearing shown in FIG. 2 is called a half bearing, two of which are combined to a pair and are used, for example, as a bearing for an engine used in an automobile. As shown in FIG. 1, the bearing 1 has a back metal layer 2, a bearing alloy layer 3 provided on the back metal layer, an intermediate plating layer 4 provided on the bearing alloy layer 3, and a Sn-based overlay layer 5 provided on the intermediate plating layer 4. On the back of the back metal layer 2, a back plating layer 6 is provided.

The back metal layer 2 is made of a thin steel sheet. In a case where the bearing alloy layer 3 is made of aluminum alloy, the aluminum alloy consists essentially of 8 mass % Sn, 2.5 mass % Si, 1.2 mass % Cu, and the balance Al. In another case where the bearing alloy layer 3 is made of Cu alloy, the Cu alloy consists essentially of 6 mass % Sn, and the balance Cu. In each of the Al alloy and the Cu alloy, no Pb is contained therein (with the exception of incidental impurities).

The intermediate plating layer 4 is made of one kind selected from the group consisting of Ni, Co, Fe, Cu, and Ag or is made of an alloy containing no Pb and containing as the main constituent thereof this one kind, which intermediate plating layer has a thickness of 0.01 to 8 μm.

The Sn-based overlay layer 5 contains the reinforcing metal and/or inorganic substance particles. In this case, the Sn-based overlay layer 5 may contains only the reinforcing metal, or may contain only the inorganic substance particles, or may contain both of the reinforcing metal and the inorganic substance particles. The reinforcing metal contained in the Sn-based overlay layer may be a metal which forms an alloy with Sn, and may be, for example, one or more kinds selected from the group consisting of Cu, Sb, Ag, In, Zn, Ni, Co, and Fe, the rate of the amount thereof to the whole being not more than 30 mass %. The inorganic substance particles may be the particles of: a nitride selected from the group consisting of BN, TiN, AlN, CuN, and $Si_3N_4$; a carbide selected from the group consisting of SiC, TiC, $B_4C$, and TaC; a fluoride selected from the group consisting of $(CF)_n$ and $CaF_2$; a sulfide selected from the group consisting of $MoS_2$ and $WS_2$; $BaSO_4$; W; or Mo, and the rate of the amount thereof is not more than 25 volume %.

The rate of the amount of the reinforcing metal or the inorganic substance particles may be made to vary stepwise, for example, in 3 stages, as shown in FIG. 1, that is, the rate of this amount regarding an central portion layer 5b is highest, the rate of this amount regarding each of a lower portion layer 5a and an upper portion layer 5c being lower than that of the central portion layer 5b. Alternatively, the lower portion layer 5a or the upper portion layer 5c may be formed to have no reinforcing metal or no inorganic substance particle.

Of course, when the rate of the amount of the reinforcing metal or the inorganic substance particles is varied stepwise in the Sn-based overlay layer 5, the number of the stepwise varying is not limited to three layers and may be four layers or more, or may be varied consecutively. In a case where the Sn-based overlay layer 5 is formed to be multi-layer having four or more layers, the rate of the amount of the reinforcing metal or the inorganic substance particles may be decreased or increased stepwise insofar as a range defined between a boundary portion layer adjacent to the intermediate plating layer and the central portion layer is concerned, however, this rate may be made to decrease insofar as another range defined between the central portion layer and the surface layer (, that is, the outermost layer) of the overlay layer is concerned. In this case where the rate of the amount of the reinforcing metal or the inorganic substance particles is increased stepwise in the range from the boundary portion layer to the central portion layer, the boundary portion adjacent to the intermediate plating layer 4 and the outermost surface portion of the overlay layer 5 may contain neither reinforcing metal nor inorganic substance particle.

Further, in another case where the rate of the amount of the reinforcing metal or the inorganic substance particles contained in the overlay layer 5 is varied consecutively, this rate may be constant or may be gradually decreased or may be gradually increased insofar as the range defined between the boundary adjacent to the intermediate plating layer 4 and the central portion of the overlay layer 5 is concerned, however, this rate is made to decrease insofar as another range defined from the central portion to the surface of the overlay layer is concerned. In this case, the rate of the amount of the reinforcing metal or the inorganic substance particles contained in the surface portion of the overlay layer 5 may be zero. Furthermore, in the case where the rate of the amount of the reinforcing metal or the inorganic substance particles contained in the overlay layer 5 is made to increase gradually from the boundary portion (adjacent to the intermediate plating layer) to the central portion of the overlay layer 5, this rate may be zero in the boundary portion adjacent to the intermediate plating layer 4.

Sn of the Sn-based overlay layer 5 diffuses in the intermediate plating layer 4, so that there is formed a layer in which Sn and metals constituting the intermediate plating layer coexist together in a mixture state. Because of this mixture layer is improved the bonding strength between the Sn-based overlay layer and the intermediate plating layer, and in turn the bonding strength between the Sn-based overlay layer and the bearing alloy layer 3 is improved. In this case, an excessive amount of the inorganic substance particles contained in the Sn-based overlay layer becomes such a factor as to hinder the bonding property. In the example shown in FIG. 1, since in the lower portion layer 5a no inorganic substance particle is contained or the rate of the amount of the inorganic substance particles is small, good bonding property can be obtained.

In the outermost portion of the Sn-based overlay layer 5, neither reinforcing metal nor inorganic substance particle is contained or the rate of the amount thereof is low, so that good initial conformability and good foreign matter embeddability can be obtained at the outermost portion thereof.

On the other hand, in the intermediate portion layer 5b of the Sn-based overlay layer 5, the reinforcing metal or inorganic substance particles are contained. The reinforcing metal forms an alloy with Sn to thereby enhance both of the mechanical strength and wear resistance of the Sn-based overlay layer 5. Further, since the inorganic substance particles are hard in hardness and are distributed in the soft Sn or Sn alloy, the mechanical strength and the wear resistance of the Sn-based overlay layer are enhanced. Therefore, as the results of the improvement regarding the mechanical strength and wear resistance of the Sn-based overlay layer 5, the anti-seizure property of the Sn-based overlay layer is also enhanced.

Next, the steps of producing the bearing 1 are explained below. First, as a stock for the bearing alloy layer, an Al alloy sheet consisting essentially, by weight, of 8% Sn, 2.5% Si, 1.2% Cu, and the balance Al was pressure-bonded, by a roll pressure bonding strength method, to a steel sheet used as a steel back metal. Then, a resultant composite stock was heat-treated at 350° C. for 4 hours, whereby a bimetal having a thickness of 1.65 mm and a width of 110 mm was produced as a stock for a sliding bearing.

This bimetal was cut and press-worked into the shape of a half bearing, a resultant half bearing being machined into a predetermined dimensions, that is, an outer diameter of 56 mm, a length of 16 mm and a thickness of 1.5 mm, and it was degreased by a detergent of water-soluble type. After these steps were performed such pre-treatments as the alkali etching, acid pickling, and zincate treatment (, that is, immersing the half bearing in a water solution containing sodium hydroxide dissolved therein as the main component thereof and zinc oxide dissolved therein, at 20° C. for about 20 seconds so that Zn was precipitated on the surface of the half bearing).

After these pre-treatments, Ni plating of 0.01 to 8 $\mu$m was applied, as an intermediate plating layer 4, on the inner surface of the half bearing, and then the Sn-based overlay layer 5 was provided on the intermediate plating layer by plating. In the plating of the Sn-based overlay layer 5, three plating operations were performed separately regarding the lower portion layer 5a, the intermediate portion layer 5b and the upper portion layer 5c, so that the Sn-based overlay layer 5 were formed which comprises the lower portion layer 5a, the intermediate portion layer 5b and the upper portion layer 5c which layers had a total thickness of 20 $\mu$m. In this case, when making the reinforcing metal contained in the intermediate portion layer 5b, the plating of an alloy containing Sn and the reinforcing metal was performed. Further, when making the inorganic substance particles contained in the Sn alloy, the inorganic substance particle were distributed in a plating solution in order that composite plating of both the inorganic substance particles and the Sn-based alloy was formed.

Regarding another bearing in which the bearing alloy layer 3 is made of the Cu alloy, the powder of a bearing alloy consisting essentially, by weight, of 6% Sn and the balance Cu were spread on a steel sheet on which Cu plating coating was formed, and it was sintered at a temperature of 700 to 900° C. for 10 to 30 minutes in a furnace having a reducing atmosphere. After that, the rolling thereof by use of rolls were repeated two times to thereby obtain a bimetal. The thickness of the resultant bimetal had, for example, a whole thickness of 1.5 mm, and the thickness of the bearing alloy layer 3 was 0.35 mm.

The bimetal thus produced was cut, being press-worked into a shape of a half bearing, and was subjected to mechanical working to thereby obtain a semi-processed half bearing having an outer diameter of 56 mm, a length of 16 mm and a thickness of 1.5 mm. Then, as the pre-treatments, the semi-processed half bearing was subjected to the pre-treatment steps of degreasing by use of a detergent of water-soluble type, electrolytic degreasing, and pickling. Then, for example, a Ni-plating coating of 0.01 to 8 $\mu$m was provided as the intermediate plating layer 4, on which the Sn-based overlay layer was formed by plating. In the plating of the Sn-based overlay layer 5, three plating operations were performed separately regarding the lower portion layer 5a, the intermediate portion layer 5b and the upper portion layer 5c, so that the Sn-based overlay layer 5 were formed which had the lower portion layer 5a, the intermediate portion layer 5b and the upper portion layer 5c, which layers had a total thickness of 20 $\mu$m. In this case, when making the reinforcing metal contained in the intermediate portion layer 5b, the plating of an alloy containing Sn and the reinforcing metal was performed. Further, when making the inorganic substance particles contained in the Sn alloy, the inorganic substance particle were distributed in a plating solution, and the plating of the Sn-based alloy was performed by use of the plating solution so that the composite plating coating of both of the inorganic substance particles and the Sn-based alloy was formed.

The inventors of the invention performed bonding strength tests of the Sn-based overlay layer regarding a bearing prepared in accordance with the embodiment of the invention and comparative bearings, the details of each of which bearings are shown in Table 1.

TABLE 1

| | Structure of the overlay layer (Components and contents of the Sn-based overlay) | | | Intermediate plating layer | | Bearing alloy layer | Bonding force (MPa) in solder bonding test |
|---|---|---|---|---|---|---|---|
| | Upper portion layer(outermost surface side) | Central portion layer | Lower portion layer | Composition | Thickness (μm) | | |
| Embodiment 1 | 0.5% Cu-0.5 vol % $Si_3N_4$ | 2.0% Cu-2.0 vol % $Si_3N_4$ | 1.0% Cu-0.8 vol % $Si_3N_4$ | Ni | 2.0 | Al alloy | 70 |
| Comparative sample 2 | 0.5% Cu-0.5 vol % $Si_3N_4$ | 3.0% Cu-2.0 vol % $Si_3N_4$ | 7.0% Cu-3.5 vol % $Si_3N_4$ | Ni | 2.0 | Al alloy | 30 |
| Comparative sample 3 | 2.0% Cu-2.0 vol % $Si_3N_4$ | 2.0% Cu-2.0 vol % $Si_3N_4$ | 2.0% Cu-2.0 vol % $Si_3N_4$ | Ni | 2.0 | Al alloy | 40 |

As shown in Table 1, the bonding strength between the Sn-based overlay layer and the intermediate plating layer in the sample of the embodiment of the invention is larger than and is superior to that of each of the comparative samples.

Further, the inventors of the invention performed seizure tests and wear tests regarding the bearings produced in accordance with the embodiment of the invention and comparative bearings, the details of each of which bearings are shown in Table 2. In the seizure test, a lubricant of VG22 pre-heated up to 100° C. was used, the load of 10 MPa being applied, an additional load of 10 MPa being further added every 10 minutes, and seizure was judged to occur when the temperature of the back face of the bearing exceeded 200° C. or when a belt for driving the shaft of a seizure-testing device was slipped due to the variation of the torque of the shaft. In the seizure tests, the counterpart shaft was made of the steel material of JIS-S55C and had a surface roughness of 0.8 μm Rmax. In the wear tests was used the lubricant of SAE20 pre-heated up to 100° C., and the evaluation of the wear was performed by the amount of wear having occurred on the Sn-based overlay layer 5 when the driving of the shaft for 20 hours at 3250 rpm was performed while applying the load of 100 MPa. The results of the tests are shown in Table 2.

TABLE 2

| No. | Structure of the overlay layer (Components and contents of the Sn-based overlay) | | | Intermediate plating layer | | Bearing alloy layer | Back face plating layer | Maximum specific load with no seizure (MPa) | wear amount in wear test (μm) |
|---|---|---|---|---|---|---|---|---|---|
| | Upper portion layer (outermost surface side) | Central portion layer | Lower portion layer | Composition | Thickness (μm) | | | | |
| Samples of the embodiments | | | | | | | | | |
| 1 | 0.2% Cu | 2.2% Cu | 0.2% Cu | Ni | 2.0 | Cu alloy | Sn | 130 | 1.3 |
| 2 | 0.5% Cu | 1.5% Cu | 0.8% Cu | Ni | 2.0 | Cu alloy | Sn-0.5% Cu | 130 | 1.5 |
| 3 | 0.5% Cu-0.5 vol % $Si_3N_4$ | 2.0% Cu-1.5 vol % $Si_3N_4$ | 1.0% Cu-0.8 vol % $Si_3N_4$ | Ni | 2.0 | Al alloy | Sn | 130 | 1.1 |
| 4 | 1.0% Cu-15.0 vol % $MoS_2$ | 2.0% Cu-20.0 vol % $MoS_2$ | 1.2% Cu-10.0 Vol % $MoS_2$ | Ni | 2.0 | Cu alloy | Sn-1.0% Cu-15.0% $MoS_2$ | 125 | 1.3 |
| 5 | 1.0% Cu | 1.5% Cu-0.5% Ni | 0.6% Cu-0.7% Ni | Ni | 0.5 | Al alloy | Sn | 120 | — |
| 6 | 10.0% Cu-5.0% Co | 20.0% Cu-7.0% Co | 8.0% Cu-2.0% Co | Ni | 2.0 | Cu alloy | Sn | 115 | — |
| 7 | 2.7% Ag | 3.5% Ag | 2.1% Ag | Ag | 5.0 | Cu alloy | Ag | 135 | — |
| 8 | 4.0% Sb | 8.0% Sb | 5.0% Sb | Ni | 2.0 | Cu alloy | Sn | 120 | — |
| 9 | 3.0% Sb-5.0% In | 8.0% Sb-4.0% In | 4.0% Sb-2.0% In | Cu-5% Zn | 2.0 | Cu alloy | Sn | 120 | — |
| 10 | 10.0% Zn | 25.0% Zn | 15.0% Zn | Cu-5% Zn | 2.0 | Cu alloy | Sn | 115 | — |
| Comparative samples | | | | | | | | | |
| 11 | Pb-8.0% Sn-2.0% Cu (Pb base) | Pb-8.0% Sn-2.0% Cu (Pb base) | Pb-8.0% Sn-2.0% Cu (Pb base) | Ni | 2.0 | Cu alloy | Sn | 135 | 3.7 |
| 12 | 8.0% Cu | 8.0% Cu | 8.0% Cu | Ni | 2.0 | Cu alloy | Sn | 90 | 1.4 |
| 13 | 4.0% Cu-4.0 vol % $Si_3N_4$ | 2.0% Cu-2.0 vol % $Si_3N_4$ | 1.5 vol % $Si_3N_4$ | Ni | 2.0 | Cu alloy | Sn | 95 | 1.2 |
| 14 | 0.5% Cu-1.0 vol % $Si_3N_4$ | 0.5 Cu-1.0 vol % $Si_3N_4$ | 0.5 vol % $Si_3N_4$ | Ni | 2.0 | Cu alloy | Sn | 120 | 2.6 |

In the bearing sample No. 1 embodying the invention shown in Table 2, Cu is contained in the Sn-based overlay layer, and the rate of the amount of Cu contained therein is such that the amount of Cu contained in a boundary portion layer adjacent of the intermediate plating layer 4 is 0.2%, such that the amount of Cu contained in the central portion layer is 2.2%, and such that the amount of Cu contained in the surface portion layer is 0.2%, the amount of Cu contained in the Sn-based overlay layer being made to consecutively increase from the boundary portion layer toward the center of the overlay layer and being made to consecutively decrease from the center of the overlay layer toward the surface of the overlay layer. The consecutive variation of the Cu amount was able to be obtained by varying the degree of stirring of plating liquid and/or current density in the same plating liquid.

The bearing sample 2 embodying the invention is one in which a back face plating layer 6 was formed after the forming of the Sn-based overlay layer by use of the same plating liquid as that of the upper portion layer 5c, the bearing sample No. 4 embodying the invention being one in which a back face plating layer 6 was formed after the forming of the Sn-based overlay layer 5 by use of the same plating liquid as that of the upper portion layer containing Sn, Cu and $MoS_2$, and the bearing sample No. 7 is one in which a back face plating layer of Ag was formed at the same time when the intermediate plating layer 4 was formed. Incidentally, regarding the wear amount measured in the wear test shown in Table 2, the mark "–" means the case where no wear amount was measured.

As apparent from Table 2, in comparative bearing sample No. 11, a high anti-seizure property is obtained, however, the amount of wear is in such a high degree as to be 3.7 μm, which means that this comparative bearing sample is low in wear resistance. On the other hand, in the bearing samples Nos. 1 to 10 embodying the invention, the maximum specific load with no seizure of each of them is in the same level as that of the comparative bearing sample No. 11, and the amount of wear regarding the samples Nos. 1 to 4 is in the degree of one-third of that of the comparative sample No. 11, which means that the samples Nos. 1 to 4 of the invention are superior to the comparative sample No. 11 in the respect of wear resistance.

Further, in comparison with the comparative bearing sample No. 12 in which no variation of the amount of Cu is provided in the Sn-based overlay layer and in comparison with the comparative bearing sample No. 13 in which the rate of the amounts of Cu and $Si_3N_4$ both contained in the Sn-based overlay layer is made to increase toward the surface of the overlay layer, the bearing samples Nos. 1 to 10 embodying the invention are superior regarding antiseizure property. In addition, the comparative bearing sample No. 14 in which the rate of the amounts of Cu and $Si_3N_4$ both contained in the central portion layer of the Sn-based overlay layer is made to be the same as that in the upper portion layer of the Sn-based overlay layer has the same level of the anti-seizure property as those of the bearing samples Nos. 1 to 10 embodying the invention, however, the wear amount of the comparative bearing sample No. 14 is larger than that of each of the bearing samples Nos. 1 to 4, that is, the bearing samples embodying the invention are superior to the comparative bearing sample regarding wear resistance.

What is claimed is:

1. A multi-layers sliding bearing comprising
    a back metal layer,
    a bearing alloy layer selected from the group consisting of a Cu alloy and an Al alloy,
    an intermediate plating layer selected from the group consisting of Ni, Ag and an alloy containing Cu as the main constituent, and
    a Sn-based overlay layer containing substantially no Pb,
    said Sn-based overlay layer containing a reinforcing metal and/ inorganic particles,
    wherein said reinforcing metal is present in an amount not more than 30 mass % and/or said inorganic particles are present in an amount not more than 25 vol %,
    a content of said reinforcing metal and/or inorganic particles being varied step-wise or successively in a direction of a thickness of said overlay layer so that said content in a thickness-wise central portion of said overlay layer is relatively high and so that said content in a surface portion of said overlay layer and a boundary portion thereof adjacent said intermediate plating layer is zero or smaller than said content in said central portion of said overlay layer.

2. A multi-layers sliding bearing according to claim 1, wherein said bearing alloy layer contains no Pb.

3. A multi-layers sliding bearing according to claim 2, wherein said intermediate plating layer contains no Pb, and has a thickness of 0.01 to 8 μm.

4. A multi-layers sliding bearing according to claim 1, wherein said reinforcing metal contained in said Sn-based overlay layer is at least one kind selected from the group consisting of Cu, Sb, Ag, In, Zn, Ni, Co, and Fe.

5. A multi-layers sliding bearing according to claim 4, wherein said bearing alloy layer contains no Pb.

6. A multi-layers sliding bearing according to claim 5, wherein said intermediate plating layer contains no Pb, and has a thickness of 0.01 to 8 μm.

7. A multi-layers sliding bearing according to claim 4, wherein said intermediate plating layer contains no Pb, and has a thickness of 0.01 to 8 μm.

8. A multi-layers sliding bearing according to claim 1, wherein said intermediate plating layer contains no Pb, and has a thickness of 0.01 to 8 μm.

9. A multi-layers sliding bearing comprising
    a back metal layer,
    a bearing alloy layer selected from the group consisting of a Cu alloy and an Al alloy,
    an intermediate plating layer selected from the group consisting of Ni, Ag and an alloy containing Cu as the main constituent,
    a Sn-based overlay layer containing substantially no Pb, and
    a back plating layer provided on a back face of said back metal layer,
    said Sn-based overlay layer containing a reinforcing metal and/or inorganic particles,
    wherein said reinforcing metal is present in an amount not more than 30 mass % and/or said inorganic particles are present in an amount not more than 25 vol %,
    a content of said reinforcing metal and/or inorganic particles being varied step-wise or successively in a direction of a thickness of said overlay layer so that said content in a thickness-wise central portion of said overlay layer is relatively high and so that said content in a surface portion of said overlay layer and a boundary portion thereof adjacent said intermediate plating layer is zero or smaller than said content in said central portion of said overlay layer.

10. A multi-layers sliding bearing according to claim 9, wherein said reinforcing metal contained in said Sn-based overlay layer is at least one kind selected from the group consisting of Cu, Sb, Ag, In, Zn, Ni, Co, and Fe.

11. A multi-layers sliding bearing according to 10, said intermediate plating layer contains no Pb, and has a thickness of 0.01 to 8 µm.

12. A multi-layers sliding bearing according to claim 11, wherein said bearing alloy layer contains no Pb.

13. A multi-layers sliding bearing according to claim 9, wherein said back plating layer has the same composition as that of said Sn-based overlay layer or of said intermediate plating layer.

14. A multi-layers sliding bearing according to claim 13, wherein said reinforcing metal contained in said Sn-based overlay layer being at least one kind selected from the group consisting of Cu, Sb, Ag, In, Zn, Ni, Co, and Fe.

15. A multi-layers sliding bearing according to claim 14, wherein said bearing alloy layer contains no Pb.

16. A multi-layers sliding bearing according to claim 14, wherein said intermediate plating layer contains no Pb, and has a thickness of 0.01 to 8 µm.

17. A multi-layers sliding bearing according to claim 16, wherein said bearing alloy layer contains no Pb.

18. A multi-layers sliding bearing according to claim 9, wherein said bearing alloy layer contains no Pb.

19. A multi-layers sliding bearing according to claim 18, herein said reinforcing metal contained in said Sn-based overlay layer being provided with at least one kind selected from the group consisting of Cu, Sb, Ag, In, Zn, Ni, Co, and Fe.

* * * * *